US012662262B2

(12) United States Patent (10) Patent No.: US 12,662,262 B2
Lee et al. (45) Date of Patent: Jun. 23, 2026

(54) LUNAR GRAVITY SIMULATION SYSTEM FOR LANDER PERFORMANCE TEST

(71) Applicant: KOREA AEROSPACE RESEARCH INSTITUTE, Daejeon (KR)

(72) Inventors: Jongwon Lee, Daejeon (KR); Dae Yeong Kim, Daejeon (KR); Choon Woo Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 286 days.

(21) Appl. No.: 18/566,393

(22) PCT Filed: Jun. 23, 2023

(86) PCT No.: PCT/KR2023/008734
§ 371 (c)(1),
(2) Date: Dec. 1, 2023

(87) PCT Pub. No.: WO2024/071577
PCT Pub. Date: Apr. 4, 2024

(65) Prior Publication Data
US 2025/0100721 A1 Mar. 27, 2025

(30) Foreign Application Priority Data

Sep. 27, 2022 (KR) ........................ 10-2022-0122876

(51) Int. Cl.
B64G 7/00 (2006.01)
G01M 99/00 (2011.01)
(52) U.S. Cl.
CPC ............. B64G 7/00 (2013.01); G01M 99/008 (2013.01)

(58) Field of Classification Search
CPC ........ B64G 7/00; G01M 99/00; G01M 99/008
See application file for complete search history.

(56) References Cited

U.S. PATENT DOCUMENTS 5,197,341 A 3/1993 Steeves

FOREIGN PATENT DOCUMENTS

CN 107182270 6/2014
CN 106005497 B * 1/2018 ............... B64G 7/00
(Continued)

OTHER PUBLICATIONS

Machine translation of CN106005497 (Year: 2018).*
(Continued)

*Primary Examiner* — Nathaniel J Kolb
(74) *Attorney, Agent, or Firm* — Perman & Green, LLP

(57) ABSTRACT

The disclosure relates to a lunar gravity simulation system for a lander performance test including a plurality of first frames extending in a height direction, a plurality of second frames extending in a horizontal direction, a plurality of third frames extending in a vertical direction, a plurality of movable frames connecting one of the plurality of third frames to another third frame, a plurality of movable bridges mounted on the movable frame and movable along the movable frame in the horizontal direction, a lander holder comprising three or more third frames, wherein the plurality of movable frames and the plurality of movable bridges are arranged between the plurality of third frames and the plurality of movable bridges are simultaneously connected to the lander holder; a connection wire connecting the lander holder to the movable bridge, and a lander connected to the lander holder.

7 Claims, 16 Drawing Sheets

(56) References Cited

FOREIGN PATENT DOCUMENTS

| CN | 111177885 | | | 5/2020 | | |
|----|-----------|---|---|--------|---|---|
| CN | 112903330 | | | 6/2021 | | |
| CN | 113104241 | | | 7/2021 | | |
| CN | 113911407 | | | 1/2022 | | |
| CN | 113911407 | A | * | 1/2022 | .............. | B64G 7/00 |
| CN | 114148554 | | | 3/2022 | | |
| CN | 114148554 | B | * | 4/2022 | .............. | B64G 7/00 |
| KR | 1020200061775 | | | 6/2020 | | |

OTHER PUBLICATIONS

Machine translation of CN113911407 (Year: 2022).*
Machine translation of CN114148554 (Year: 2022).*
International Search Report for application No. PCT/KR2023/ 008734 dated Sep. 20, 2023.
Huiping, Chu, et al., "Trajectory optimization for lunar soft landing with complex constraints", Advances in Space Research, vol. 60, Issue 9, Nov. 1, 2017, pp. 2060-2076, https://doi.org/10.1016/j.asr. 2017.07.024.

* cited by examiner

LUNAR GRAVITY SIMULATION SYSTEM FOR LANDER PERFORMANCE TEST

TECHNICAL FIELD

The present disclosure relates to a lunar gravity simulation system for a lander performance test, and more particularly, to a lunar gravity simulation system for a lunar performance and verification test for creating a test environment for a wide range of surfaces to simulate a wide range of lunar surfaces to perform a lander performance test.

BACKGROUND ART

Referring to FIG. 1, soft lunar landing includes a powered descent phase 10, an approach phase 20, and a landing phase 30, and large soft landing technology equipment is equipment for verifying the landing phase 30 process.

In detail, in the powered descent phase 10, the flight speed of a lander is greatly reduced with respect to the lunar surface to lower the flight altitude from 15 km to about 2 km to about 3 km through a main engine ignition of the lander. In the approach phase 20, a safe target point for landing is detected, the flight speed is reduced, and the lander drops to an altitude of about 100 m to about 200 m.

The landing phase 30 is a final stage of detecting and avoiding obstacles such as steep slopes, rocks, and pits on the moon surface as the altitude is lowered for a soft landing at a safe landing site. In this case, the lunar lander is directly affected by lunar gravity.

In a general lunar landing scenario, the powered descent phase 10 starts at a 15 km point from the lunar surface and the approach phase 20 starts at a point about 6 km to about 8 km from the lunar surface. Thereafter, the landing phase 30 is proceeded at a height of 100 m.

The lunar gravity simulation system is being developed to predict the lunar landing scenario on the earth. The lunar gravity simulation system for verifying the landing phase 30 may verify the navigation and posture control logic of the lander in an environment simulating the lunar gravity of 1/6 g and comprehensively verify the landing stability. However, the lunar gravity simulation system has the following problems.

Since the size of a general lander is about 3 m to about 5 m, it is necessary to avoid obstacles with sizes of 1 m on the moon surface. Since it is difficult to predict the situation of the lunar surface accurately and observe and control data of the lander in real time due to the communication distance between the earth and the moon, in real exploration, an autonomous determination and avoidance of obstacles by a probe is necessary.

Therefore, it is important for the lunar gravity simulation system to form a test environment for a wide range of surfaces to simulate an actual lunar landing phase. Nevertheless, it is difficult to form the test environment for a wide range of surfaces through the lunar gravity simulation system of the related art.

DISCLOSURE

Technical Problem

The disclosure relates to a lunar gravity simulation system for a lander performance test, that is, a lunar gravity simulation system for a lunar performance and verification test capable of forming a test environment for a wide range of surfaces to simulate a wide range of lunar surfaces to perform a lander performance test.

Technical Solution

According to an embodiment, a lunar gravity simulation system for a lander performance test includes a plurality of first frames extending in a height direction, a plurality of second frames extending in a horizontal direction, a plurality of third frames extending in a vertical direction, a movable frame extending in the horizontal direction and connecting one of the plurality of third frames to another third frame, wherein the movable frame is movable in the vertical direction along the third frame, a movable bridge mounted on the movable frame and movable along the movable frame in the horizontal direction, a lander holder comprising three or more third frames, wherein the plurality of movable frames and the plurality of movable bridges are arranged between the plurality of third frames and the plurality of movable bridges are simultaneously connected to the lander holder; a connection wire connecting the lander holder to the movable bridge, and a lander connected to the lander holder.

The lunar gravity simulation system for the lander performance test may further include a load cell and an angle sensor each connected to the connection wire.

The movable bridge of the lunar gravity simulation system for the lander performance test may include a first motor configured to apply force to the connection wire.

The movable bridge of the lunar gravity simulation system for the lander performance test may be connected to the lander holder through two or more of the connection wires.

The lander holder of the lunar gravity simulation system for the lander performance test may have an arc shape or a semicircle shape.

The lunar gravity simulation system for the lander performance test may further include a suspension wire connecting the lander holder to the lander.

The lander holder of the lunar gravity simulation system for the lander performance test may be connected to the lander through the suspension wire.

A gimbal of the lunar gravity simulation system for the lander performance test may be included in the suspension wire.

The movable bridge of the lunar gravity simulation system for the lander performance test may include a coupler to which the connection wire is connected, a connection frame arranged on the upper portion of the coupler, the connection frame having a groove therein and being coupled to the movable bridge, and the movable frame may be inserted into the groove of the connection frame.

The lunar gravity simulation system for the lander performance test may further include a second motor configured to move the movable bridge along the movable frame, a third motor configured to move the movable frame along the third frame, and a controller configured to control an operation of the first motor, the second motor, and the third motor.

A camera may be included in the lander of the lunar gravity simulation system for the lander performance test, and the controller may receive image data from the camera and control the operation of the second motor and the third motor according to the image data to move the movable bridge.

The controller of the lunar gravity simulation system for the lander performance test may control the operation of the third motor to move the plurality of movable bridges along the third frame at the same speed.

The plurality of movable bridges of the lunar gravity simulation system for the lander performance test may be arranged on the same first line and moved at a same speed through the third motor, and the first line may extend in the horizontal direction.

The controller of the lunar gravity simulation system for the lander performance test may simulate gravity only through the connection wire connecting the movable bridge provided on the upper portion of the lander holder to the lander holder when the lander holder is arranged on a vertical lower portion of the movable bridge, and the controller may simulate gravity through the connection wire connecting the movable bridge to the lander holder and the connection wire connecting the other movable bridge to the lander holder when the lander holder is arranged between one of the movable bridges and another one of the movable bridges.

The controller of the lunar gravity simulation system for the lander performance test may control the operation of the third motor to move at least two of the plurality of movable bridges at a same speed along the third frame.

Advantageous Effects

The disclosure relates to a lunar gravity simulation system for a lander performance test capable of proceeding the lander performance test with respect to a wide range of surfaces by including a plurality of movable bridges that may be moved in a horizontal direction or a vertical direction and simultaneously connecting a plurality of movable bridges to a lander holder to which a lander is connected.

BEST MODE

Mode for Invention

The specification clarifies the scope of rights of the disclosure and explains the principle of the disclosure and discloses embodiments for one of ordinary skill in the art to implement the disclosure. The disclosed embodiments may be implemented in various forms.

Expressions such as "including" or "may include" that may be used in various embodiments of the disclosure refer to the corresponding function that is disclosed, operations or elements, and the like, and do not limit one or more additional functions, operations or elements, and the like. In addition, in the various embodiments of the disclosure, the expression "include" or "have" indicates the feature, number, step, operation, element, component, or a combination thereof in the specification, and indicates that the presence or possibility of adding one or more features, numbers, steps, operations, elements, components, or a combination thereof is not excluded in advance.

When an element is mentioned as being "connected, coupled" to another element, this may refer to a case wherein the element is directly connected or coupled to the other element, but may also refer to a case wherein a new different element is arranged between the element and the other element. On the other hand, when an element is referred to as being "directly connected" or "directly coupled" to another element, it may be understood a new different element is not arranged between the element and the other element.

While such terms as "first," "second," etc., may be used to describe various elements, such elements should not be limited to the above terms. The above terms are used only to distinguish one component from another.

The present disclosure is related to a lunar gravity simulation system for a lander performance test, that is, a lunar gravity simulation system for a lunar performance and verification test capable of forming a test environment for a wide range of surfaces to simulate a wide range of lunar surfaces to perform a lander performance test.

The lunar gravity simulation system for a lander performance test may be a system for simulating a lunar surface to simulate the lander performance test. The lunar gravity simulation system for the lander performance test is not limited to simulating the lunar surface and may simulate the surface of a planet. Hereinafter, embodiments of the disclosure will be described in detail with reference to the accompanying drawings.

Figure 1:
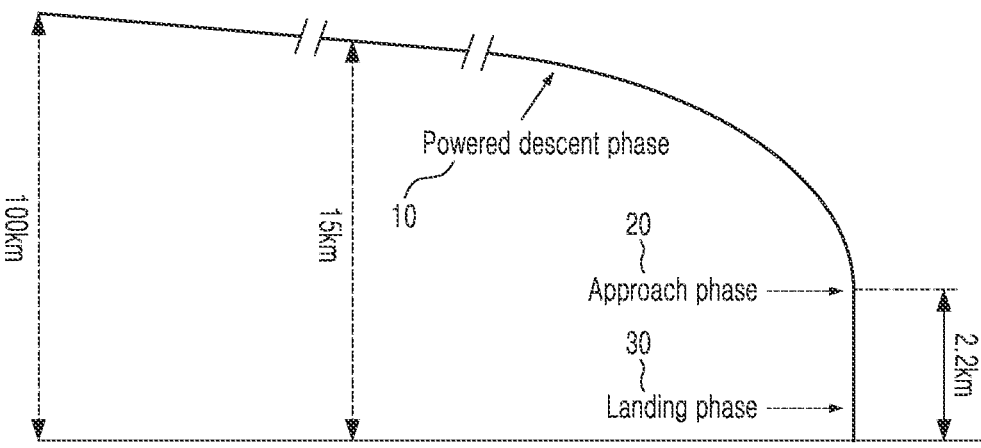
FIG. 1 is a view showing a soft landing process of a lander.
Figure 2:
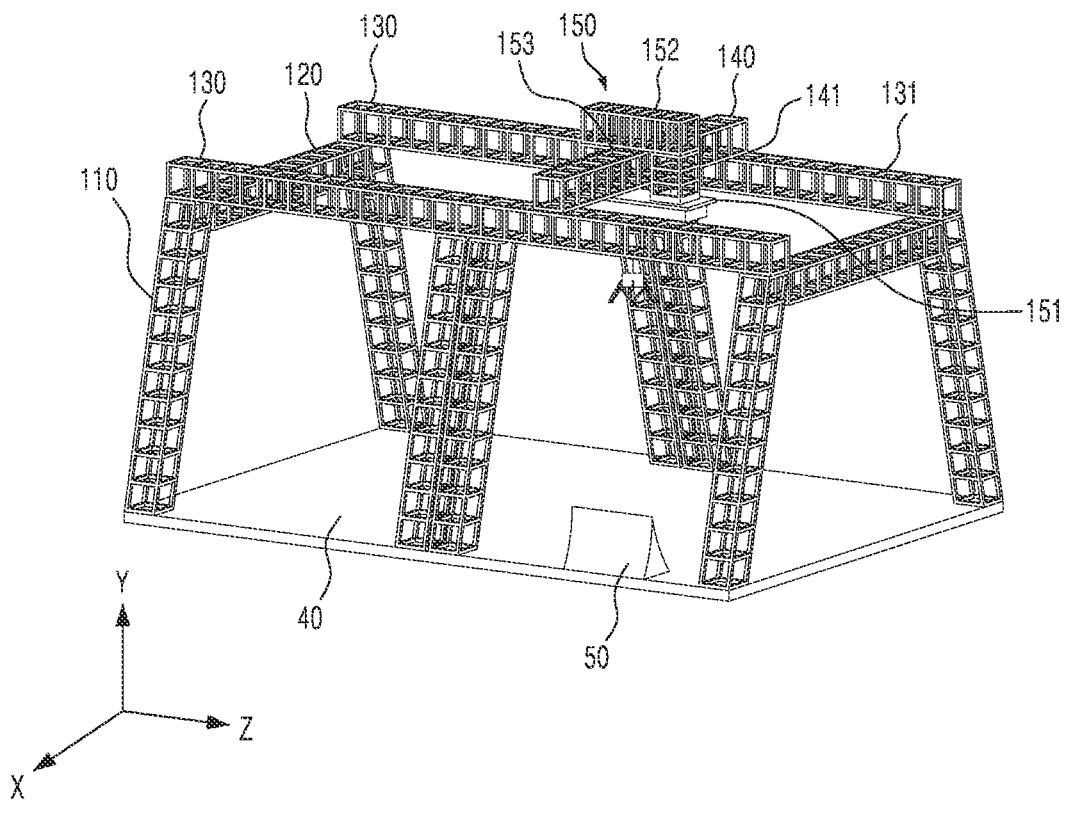
FIG. 2 is a view of moving a lander through a movable bridge.
Figure 3:
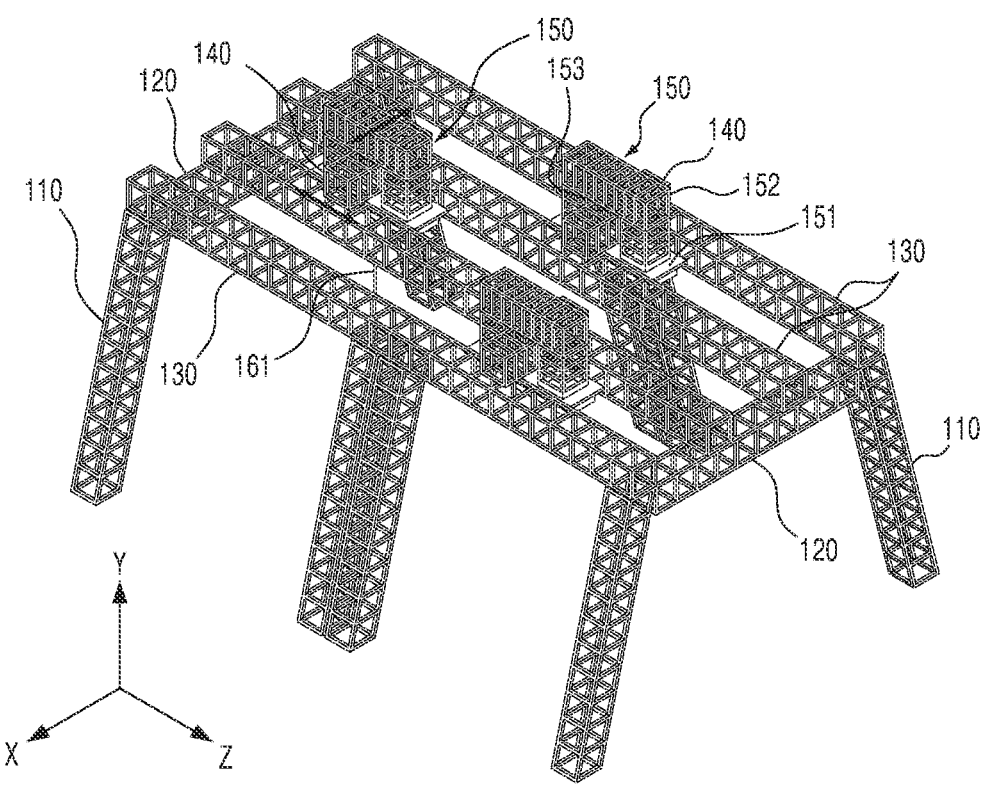
FIG. 3 is a perspective view of a lunar gravity simulation system having a plurality of movable bridges according to an embodiment.

Referring to FIGS. 2 and 3, the lunar gravity simulation system for the lander performance test according to an embodiment may include a first frame 110, a second frame 120, a third frame 130, a movable frame 140, a movable bridge 150, a lander holder 160, a connection wire 161, and a lander 170.

The first frame 110 may extend in a height direction, the second frame 120 may extend in a horizontal direction, and the third frame 130 may extend in a vertical direction.

Referring to FIGS. 2 and 3, the height direction may be a y-axis direction, the horizontal direction may be an x-axis direction, and the vertical direction may be a z-axis direction.

The lunar gravity simulation system for the lander performance test according to an embodiment may include a plurality of first frames 110, a plurality of second frames 120, and a plurality of third frames 130. The plurality of second frames 120 and the plurality of the third frames 130 may be installed on an upper part of the plurality of the first frames 110.

The first frame 110 may be installed in a lunar surface simulation plate, wherein the first frame 110 may be installed in an upper direction on the lunar surface simulation plate. The second frame 120 and the third frame 130 may be installed on the upper part of the first frame 110 installed in the upper direction on the lunar surface simulation plate.

The lunar surface simulation plate may include a lunar surface simulation plate for a soft landing test 40, and a lunar surface simulation plate 50 for an impact and stability test, and a variety of environments for simulation of the lunar surface may be formed on the lunar surface simulation plate.

According to an embodiment, the first frame 110 may extend to about 60 to about 120 m, the second frame 120 may extend to about 30 m to about 50 m, and the third frame 130 may extend to about 100 m to about 120 m.

The movable frame 140 may extend in the horizontal direction, connect the third frame 130 to another third frame 130, and be moved in the vertical direction along the third frame 130.

The movable frame 140 may be installed on a pair of third frames 130, an end of the movable frame 140 may be supported by the third frame 130, and the other end of the movable frame 140 may be supported by the third frame 130.

The movable frame 140 may be moved in the vertical direction along the third frame 130. The third frame 130, which extends in the vertical direction, may include a rail 131, and a wheel 141 may be provided on a lower portion of the movable frame 140.

The movable frame 140 installed on the pair of third frames 130 may be moved in the vertical direction along the pair of third frames 130 through the rail 131 and the wheel 141.

The movable bridge 150 may be installed on the movable frame 140 and be moved in the horizontal direction along the movable frame 140. The movable bridge 150, which is movably installed on the movable frame 140 extending in the horizontal direction, may be moved in the horizontal direction along the movable frame 140.

The lander 170 may be connected to the movable bridge 150 through the connection wire 161. By moving the movable bridge 150 in the horizontal direction along the movable frame 140, the lander 170 connected to the movable bridge 150 may be moved in the horizontal direction.

In addition, as the movable frame 140 is moved in a vertical direction along the third frame 130, the movable bridge 150 coupled to the movable frame 140 may be moved in the vertical direction. As the movable bridge 150 is moved in the vertical direction, the lander 170 connected to the movable bridge 150 may be moved in the vertical direction.

In this regard, the lander 170 may be moved in the horizontal and vertical directions according to the movement of the movable frame 140 and the movable bridge 150.

According to an embodiment, the movable frame 140 may include a coupler 152 and a connection frame 152. The coupler 151 may have a plate shape and be coupled to the connection wire 161 connected to the lander 170. The coupler 151 may include various devices for lunar gravity simulation.

The connection frame 152 may be coupled to the movable frame 140 as a groove 153 is formed in the connection frame 152. Referring to FIGS. 2 and 3, the connection frame 152 may be a "⊏" shaped frame with the groove 153 formed thereinside, and the connection frame 152 may be coupled to the upper portion of the coupler 151.

The connection frame 152, which may be coupled to the movable frame 140, may be movably coupled to the movable frame 140. The connection frame 152 may be moved along the movable frame 140, and thus, the movable bridge 150 may be moved along the movable frame 140.

When the connection frame 152 is coupled to the movable frame 140, the movable frame 140 may be inserted into the groove 153 of the connection frame 152. In detail, the movable frame 140 may be inserted into the groove 153 of the connection frame 152, and the connection frame 152 may be coupled to the movable frame 140 on the upper portion of the movable frame 140.

According to an embodiment, as shown in FIG. 2, only one movable bridge 150 may be provided, and the lander 170 may be coupled to the movable bridge 150 through the connection wire 161.

However, if only one movable bridge 150 is provided, there is difficulty in performing the lander 170 performance test regarding a wide range of surfaces.

The length of the third frame 130 may be increased as the number of the first frames 110 that are installed are increased, thereby increasing the movement distance of the movable bridge 150 in the vertical direction.

However, it is difficult to increase the length of the second frame 120 when one movable bridge 150 is used. Referring to FIG. 2, when the length of the second frame 120 increases, the length of the movable frame 140, which moves the movable frame 150, is also increased, thereby causing the structural stability to be reduced. Accordingly, the movement in the horizontal direction is limited due to the movable bridge 150.

To solve the above limitation, the lunar gravity simulation system for the lander performance test according to an embodiment may use a plurality of movable bridges 150 while simultaneously connecting the plurality of movable bridges 150 to the lander 170.

Figure 4:
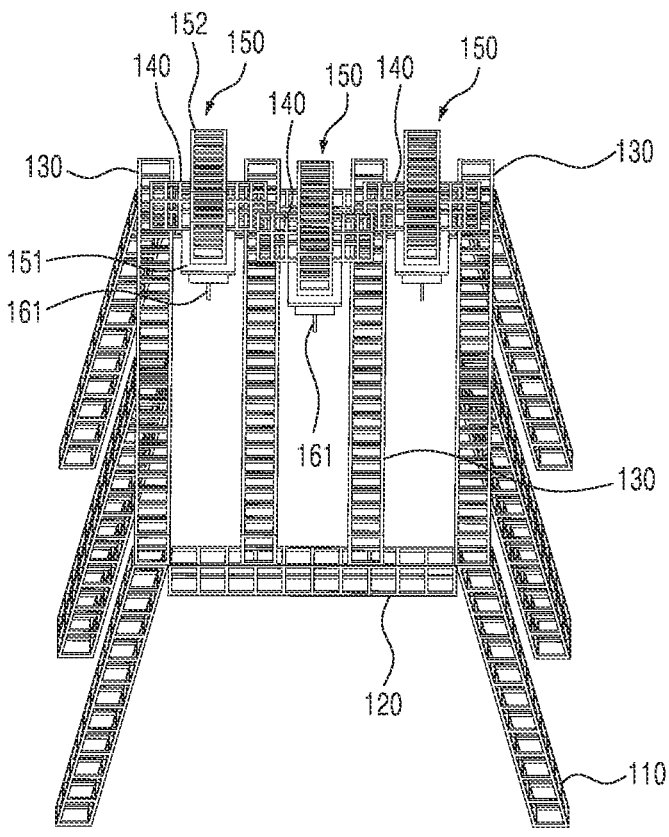
FIG. 4 is a side view of a lunar gravity simulation system including a plurality of movable bridges according to an embodiment.

In detail, referring to FIG. 4, three or more third frames 130 may be provided, and a plurality of movable frames 140 and a plurality of movable bridges 150 may each be provided between the plurality of third frames.

Figure 5:
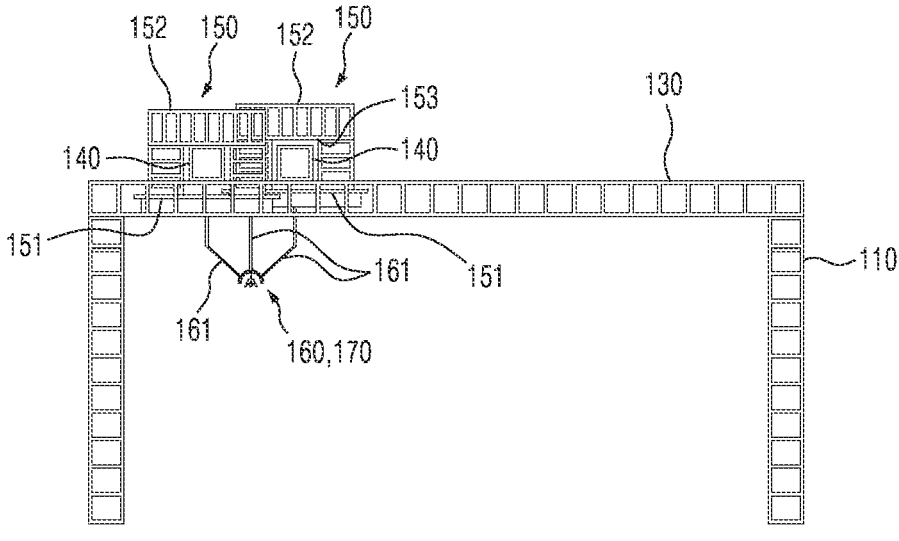
FIG. 5 is a view illustrating a plurality of movable bridges connected to one lander holder and the lander holder connected to a lander, according to an embodiment.
Figure 6:
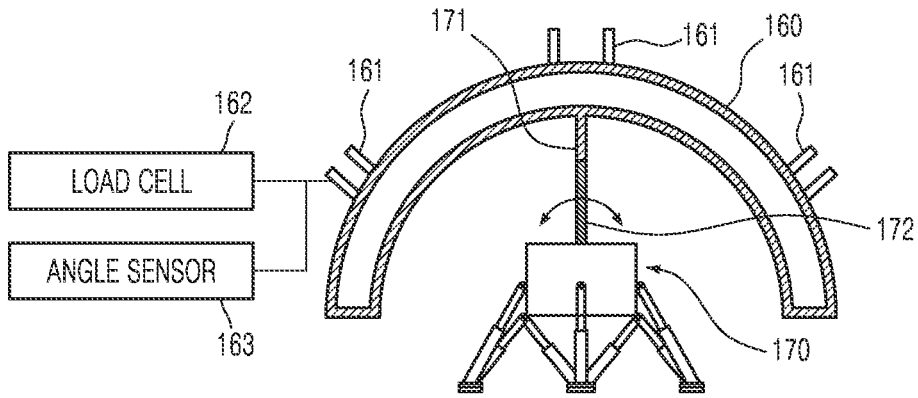
FIG. 6 is a view showing a lander holder and a lander according to an embodiment.

Referring to FIGS. 5 and 6, the lander holder 160, which is provided to simultaneously connect the plurality of movable bridges 150 to the lander 170, may be simultaneously connected to the movable bridge 150.

The lander holder 160 may be connected to the movable bridge 150 through the connection wire 161, and the lander 170 may be connected to the lander holder 160.

The lunar gravity simulation system for the lander performance test according to an embodiment may further include a suspension wire 171 connecting the lander holder 160 to the lander 170, and the lander holder 160 may be connected to the lander 170 through the suspension wire 171.

In addition, according to an embodiment, the suspension wire 171 may be include a gimbal 172. The gimbal 172, which maintains the horizontality of the lander 170, may rotate the lander 170 in a direction opposite to the inclining direction of the lander 170 to maintain the horizontality of the lander 170. According to an embodiment, the connection wire 161 may include the gimbal 172.

The lander holder 160 may be simultaneously connected to the plurality of movable bridges 150 through the connection wire 161. In this case, one of the movable bridges 150 needs to be connected to the lander holder 160 through two or more of the connection wires 161. That is, through two or more of the connection wires 161, one of the movable bridges 150 may be connected to the lander holder 160.

When the plurality of movable bridges 150 are connected simultaneously to the lander holder 160, an angle may be formed in the connection wire 161. Since an angle formed in the connection wire 161 may cause a problem in structural stability, it is appropriate to connect one of the movable bridges 150 to the lander holder 160 through two or more connection wires.

However, embodiments are not limited thereto, and one of the movable bridges 150 may be connected to the lander holder 160 through one connection wire 161.

Figure 7:
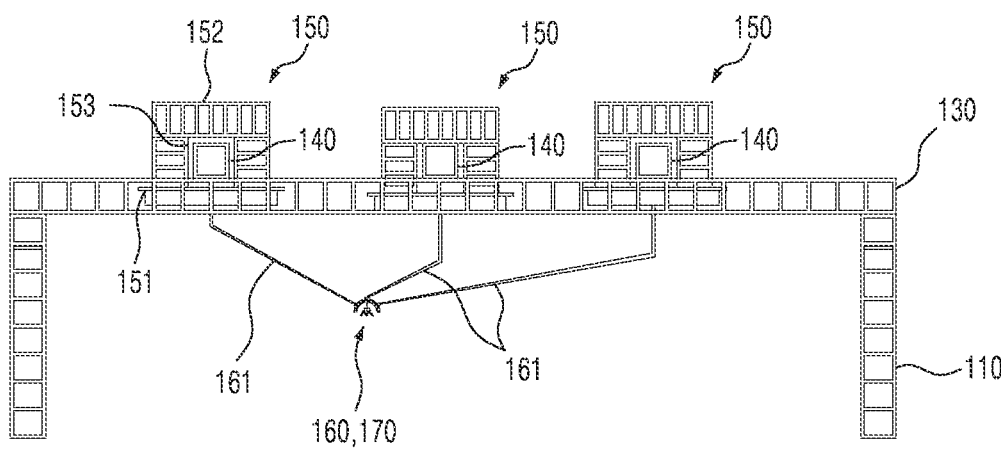
FIGS. 7 to 9 are each a view illustrating a plurality of movable bridges connected to one lander holder and the lander being moved through the plurality of movable bridges connected to a lander, according to an embodiment.
Figure 8:
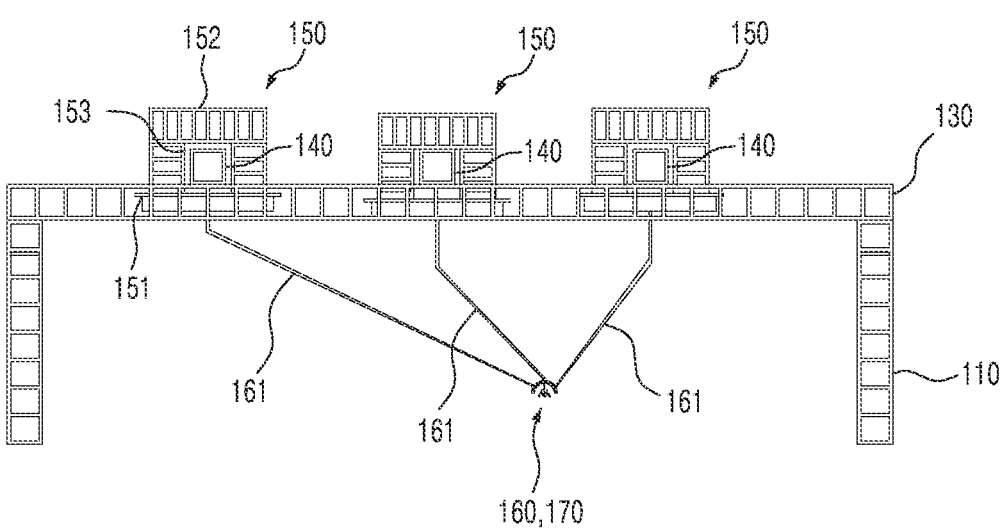
Figure 9:
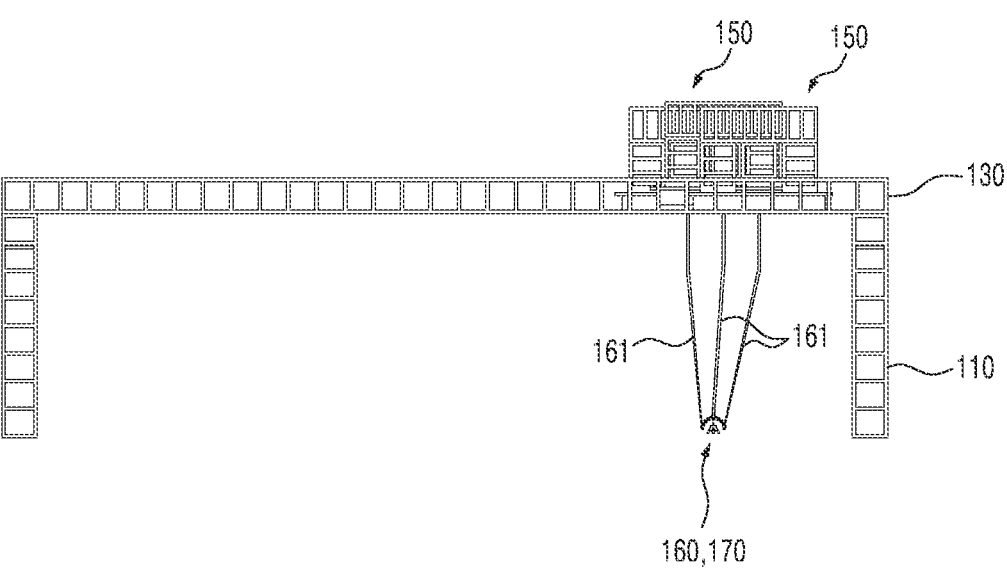

According to an embodiment, three of the movable bridges 150 may be simultaneously connected to the lander holder 160. Referring to FIGS. 7, 8, and 9, three of the movable bridges 150 may be simultaneously connected to the lander holder 160, the lander 170 may be connected to the lander holder 160 through the suspension wire 171, and then the three movable bridges 150 may be moved to adjust the position of the lander 170.

However, the number of movable bridges 150 connected to the lander holder 160 is not limited to three, and the number may vary as necessary.

The lunar gravity simulation system for the lander performance test according to an embodiment may further include a load cell 162 and an angle sensor 163, both connected to the connection wire 161.

The load cell 162 may measure the load applied to the connection wire 161, and the angle sensor 163 may measure the angle of which the connection wire 161 coupled to the movable bridge 150 is connected to the lander holder 160.

Figure 10:
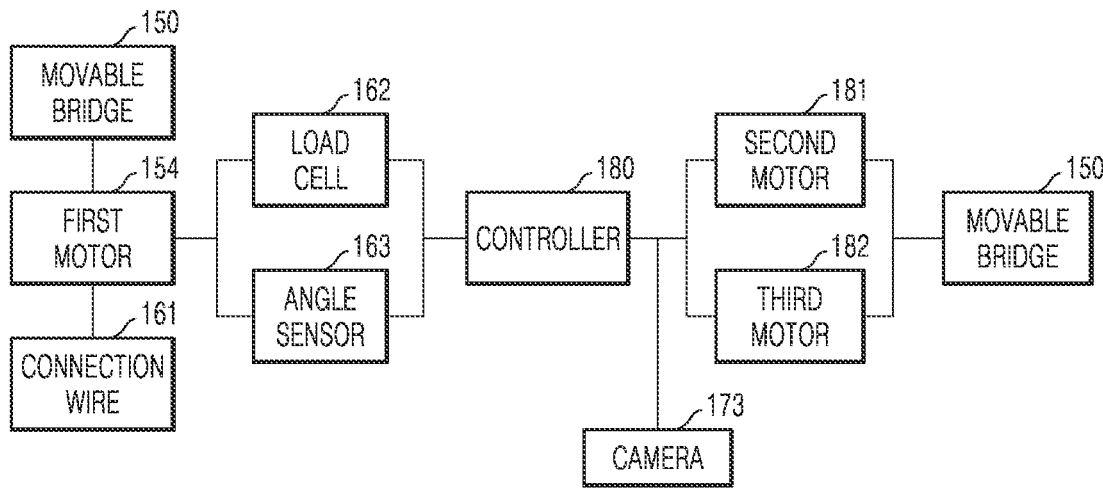
FIG. 10 is a view illustrating an operation relation between a controller, a first motor, a second motor, and a third motor.

Referring to FIG. 10, the movable bridge 150 according to an embodiment may include a first motor 154 that may apply force on the connection wire 161. The first motor 154 may be an electric motor, and the first motor 154 may apply force on the connection wire 161.

According to an embodiment, the number of the first motor 154 may be the same as the number of the connection wire 161 connected to the lander holder 160. For example, when three movable bridges 150 are connected to the lander holder 160, each of the movable bridges 150 may be connected to the lander holder 160 through two of the connection wires 161. Accordingly, six connection wires 161 may be connected to the lander holder 160. In this case, the same number of first motors 154 as that of the connection wires 161 connected to the lander holder 160, that is, six first motors 154, may be provided.

However, embodiments are not limited thereto, and the number of the first motor 154 may be greater than the number of connection wires 161 connected to the lander holder 160.

The lunar gravity simulation system for the lander performance test according to an embodiment may simulate the lunar gravity through the first motor 154, the load cell 162, and the angle sensor 163.

In detail, force is applied to the connection wire 161 through the first motor 154, and the amount and direction of the force applied to the lander 170 may be measured through the load cell 162 and the angle sensor 163.

When three of the movable bridges 150 are connected to the lander holder 160, each connection wire 161 connecting one of the movable bridges 150 and the lander holder 160 may include the load cell 162 and the angle sensor 163.

The force applied on the lander 170 may be obtained when a resultant force is obtained through the amount and direction of force measured by the load cell 162 and the angle sensor 163. Since the force of lunar gravity is ⅙ the force of gravity on earth, the operation of the first motor 154 may be controlled such that the resultant force applied to the lander 170 becomes ⅚ the weight of the lander 170, thereby allowing the simulation of the lunar gravity.

The lunar gravity simulation system for the lander performance test according to an embodiment may further include a controller 180 for controlling the operation of the first motor 154. Referring to FIG. 10, the controller 180 may simulate the lunar gravity by controlling the operation of the first motor 154.

According to an embodiment, the controller 180 may simulate the lunar gravity while controlling the operation of the first motor 154 according to the resultant force obtained from the load cell 162 and the angle sensor 163.

Referring to FIG. 6, the lander holder 160 according to an embodiment may have an arc shape or semicircle shape. The lander holder 160, which connects the plurality of movable bridges 150 to the lander 170, may be form various angles with the plurality of connection wires 161 connected to the lander holder 160.

To disperse the force applied on the plurality of connection wires 161 connected to the lander holder 160, the lander holder 160 may have an arc shape extended as much as a predetermined angle and may also have a semicircle shape.

In the lunar gravity simulation system for the lander performance test according to an embodiment, the plurality of movable bridges 150 may be connected to each other through the lander holder 160, and the lander holder 160 may be connected to the lander 170 through the suspension wire 171, thereby minimizing the shaking of the lander 170.

When the plurality of movable bridges 150 are directly connected to the lander 170 and the lander 170 is moved through the plurality of movable bridges 150, the lander 170 may shake as force is applied to various points of the lander 170 due to the operation of the plurality of movable bridges 150.

To prevent the above case, the lunar gravity simulation system for the lander performance test according to an embodiment may connect the plurality of movable bridges 150 to each other through the lander holder 160 and may connect the lander holder 160 to the lander 170 through the suspension wire 171.

Accordingly, the lunar gravity simulation system for the lander performance test according to an embodiment may minimize the shaking of the lander 170 as the force applied on the lander 170 leads to one direction (the suspension wire 171).

The lunar gravity simulation system for the lander performance test according to an embodiment may further include a second motor 181 that moves the movable bridge 150 along the movable frame 140, a third motor 182 that moves the movable frame 140 along the third frame 130, and the controller 180 that controls the operation of the second motor 181 and the third motor 182.

The second motor 181 and the third motor 182 may be a hydraulic motor, and the movable bridge 150 may be moved in the horizontal direction or the vertical direction through the operation of the second motor 181 and the third motor 182.

Referring to FIG. 10, the controller 180, which controls the operation of the second motor 181 and the third motor 182, may control the operation of the first motor 154.

The controller 180 controlling the first motor 154, the second motor 181, and the third motor 182 may include one controller, and the controller 180 may include a plurality of controllers to control each of the first motor 154, the second motor 181, and the third motor 182.

The lander 170 according to an embodiment may include a camera 173, and the controller 180 may receive image data of the camera 173 and control the operation of the second motor 181 and the third motor 182 according to the image data to move the movable bridge 150.

The controller 180 may move the movable bridge 150 such that the lander 170 is seated on the lunar surface simulation plate for the soft landing test 40 while avoiding the lunar surface simulation plate for the impact and stability test 50, based on the image data measured by the camera 173.

Hereinafter, a method of controlling the lander 170 through the movable bridge 150 in the lunar gravity simulation system for the lander performance test according to an embodiment will be described in detail.

Figure 11:
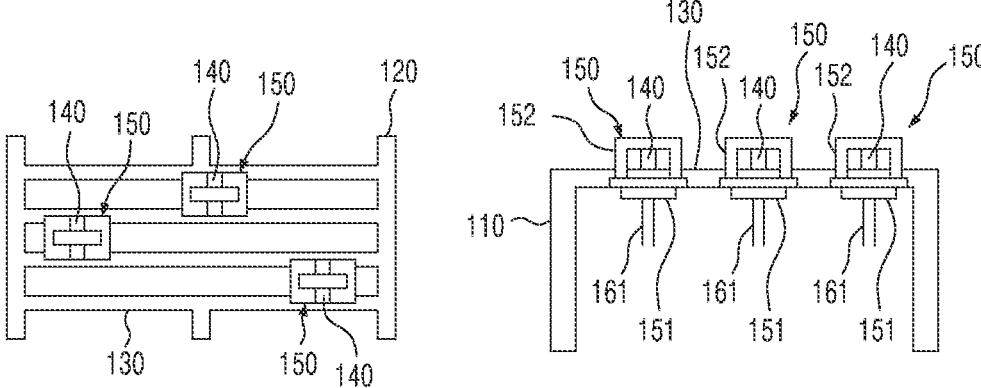
FIG. 11 is a plan view and a front view simulating a first frame, a second frame, a third frame, a movable bridge, and a movable frame, according to an embodiment.
Figure 12:
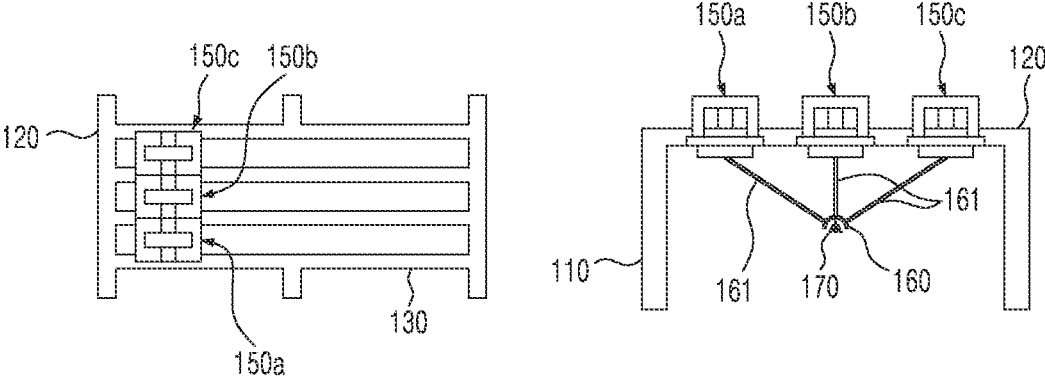
FIG. 12 is a plan view and a front view illustrating a plurality of movable bridges arranged on the same line, according to an embodiment.

Referring to FIGS. 11 and 12, when the plurality of movable bridges 150 are connected to the lander holder 160 through the connection wire 161, simulation of gravity may become difficult due to the occurrence of an angle in the connection wire 161.

To this end, the controller 180 according to an embodiment may control the operation of the third motor 182 to move the plurality of movable bridges 150 at the same speed.

Figure 13:
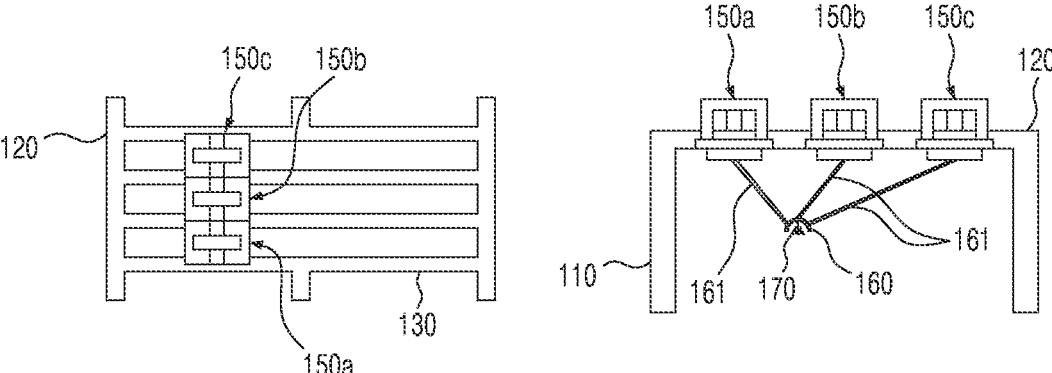
FIGS. 13 and 14 are views illustrating a plurality of movable bridges arranged on the same line, and the movable bridge being moved in the horizontal direction along the movable frame, according to an embodiment.

In more detail, while the plurality of movable bridges 150 according to an embodiment are arranged on the same first line as in FIG. 13, the controller 180 may move the plurality of movable bridges 150 at the same speed through the third motor 182.

Here, the first line may be extended in the horizontal direction (the X axis), and the plurality of movable bridges 150 may be disposed on the first line extended in the horizontal direction.

In this regard, when the plurality of movable bridges 150 are arranged on the same first line and the plurality of movable bridges 150 are moved at the same speed through the controller 180, the plurality of movable bridges 150 may move while forming a single plane.

When the plurality of movable bridges 150 move while forming a plane, the z-axis direction may not necessarily be considered when measuring the force and angle generated in the connection wire 161 through the load cell 162 and the angle sensor 163.

In detail, when the resultant force of the plurality of connection wires 161 are obtained through the load cell 162 and the angle sensor 163, since the z-axis direction (vertical direction) does not need to be considered, the lunar gravity may be easily simulated through the controller 180.

When the lander holder 160 is arranged on the vertical lower portion of the movable bridge, the controller 180 according to an embodiment may only simulate gravity through the connection wire 161 connecting the movable bridge 150 provided on the upper portion of the lander holder 160 to the lander holder 160.

In addition, when the lander holder 160 is arranged between the movable bridge 150 and another movable bridge 150, the controller 180 according to an embodiment may simulate gravity through the connection wire 161 connecting the movable bridge 150 to the lander holder 160 and the connection wire 161 connecting the other movable bridge 150 to the lander holder 160.

When connecting the plurality of movable bridges 150 to the lander holder 160 through the connection wire 161, the lander holder 160 may be arranged on the vertical lower portion of the movable bridge 150 or between the movable bridge 150 and another movable bridge 150.

For example, when the movable bridge 150 includes a first movable bridge 150a, a second movable bridge 150b, and a third movable bridge 150c as shown in FIGS. 12 and 13, the lander holder 160 may be arranged on the vertical lower portion of the first movable bridge 150a, the second movable bridge 150b, and the third movable bridge 150.

When the lander holder 160 is not placed in the vertical lower portion of the first movable bridge 150a, the second movable bridge 150b, and the third movable bridge 150c, the lander holder 160 may be arranged between the first movable bridge 150a and the second movable bridge 150b or between the second movable bridge 150b and the third movable bridge 150c.

That is, the movable bridge 150 may be arranged in the vertical lower portion of one movable bridge 150 or between one movable bridge 150 and another movable bridge 150.

When the lander holder 160 is arranged on the vertical lower part of the movable bridge, the controller 180 may only simulate gravity through the connection wire 161 connecting the movable bridge 150 provided on the upper part of the lander holder 160 to the lander holder 160.

Referring to FIG. 12, when the lander holder 160 is arranged only at the vertical lower portion of the second movable bridge 150b, the controller 180 may only simulate gravity through the connection wire 161 connecting the second movable bridge 150b to the lander holder 160.

In detail, the controller 180 may simulate the lunar gravity of ⅙ g by applying the connection wire 161 power of ⅚ g through the first motor 154. In this case, the connection wire 161 connecting the first movable bridge 150a and the third movable bridge 150c to the lander holder 160 may only simply support the lander holder 160.

When the controller 180 is arranged between the movable bridge 150 and another movable bridge 150, the lunar gravity may only be simulated through the connection wire connecting the movable bridge 150 to the lander holder 160 and the connection wire 161 connecting the other movable bridge 150 to the lander holder 161.

Figure 14:
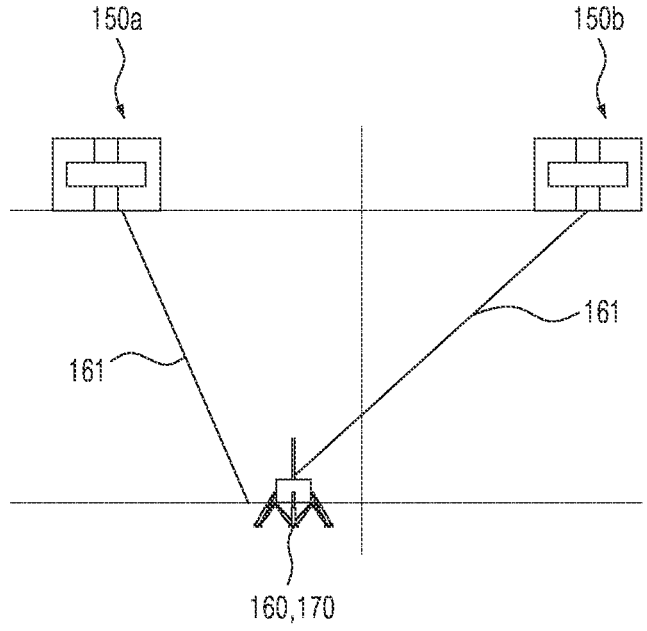

Referring to FIGS. 13 and 14, when the lander holder 160 is disposed between the first movable bridge 150a and the second movable bridge 150b, the lunar gravity may be simulated only through the connection wire 161 connecting the first movable bridge 150a to the lander holder 160 and the connection wire 161 connecting the second movable bridge 150b to the lander holder 160.

In detail, when the lander holder 160 is arranged between the first movable bridge 150a and the second movable bridge 150b, the controller 180 may apply a force of 5/12 g through the connection wire 161 connecting the first movable bridge 150a to the lander holder 160 and the connection wire 161 connecting the second movable bridge 150b to the lander holder 160.

In this regard, when a force of 5/12 g is applied through the connection wire 161 connecting the first movable bridge 150a to the lander holder 160 and the connection wire 161 connecting the second movable bridge 150b to the lander holder 160, the lunar gravity of 1/6 g may be simulated as a force of 5/6 g is applied to the lander holder 160 through the resultant force. In this case, the connection wire 161 connecting the third movable bridge 150c to the lander holder 160 may only simply support the lander holder 160.

Figure 15:
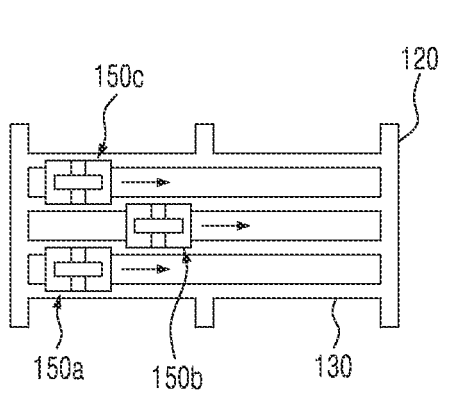
FIG. 15 is a view illustrating a plurality of movable bridges not arranged on the same line, according to an embodiment.
Figure 15:
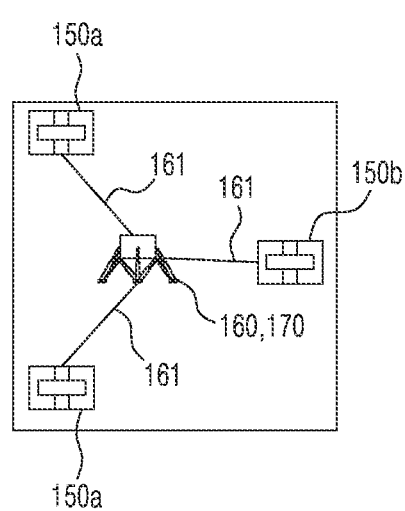

Referring to FIG. 15, the plurality of movable bridges 150 according to an embodiment may not be arranged on the same first line. However, even in case of the above, the controller 180 may control the operation of the third motor 182 to move the plurality of movable bridges 150 along the third frame 130 at the same speed.

When the plurality of movable bridges 150 move at the same speed, variables to be considered when simulating the lunar gravity through the controller 180 and the first motor 154 are decreased, and thus, the lunar gravity may be easily simulated through the controller 180 and the first motor 154.

Figure 16:
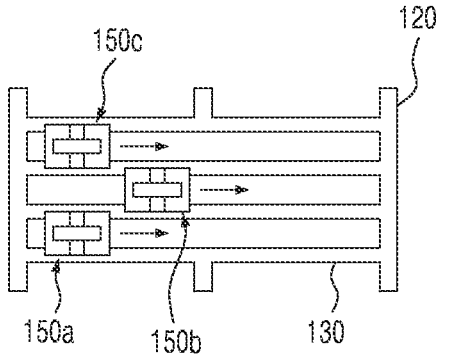
FIG. 16 is a view illustrating a plurality of movable bridges being moved at different speeds, according to an embodiment.
Figure 16:
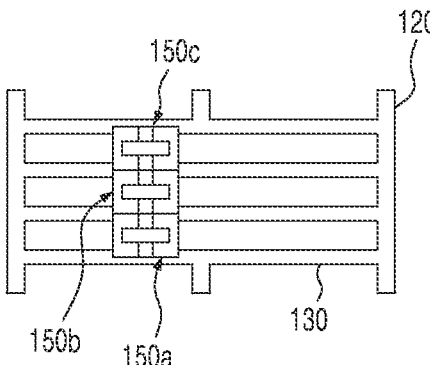

Referring to FIG. 16, the plurality of movable bridges 150 according to an embodiment may not move in the same speed. However, to easily simulate the lunar gravity through the controller 180 and the first motor 154, it is necessary that the controller 180 controls the operation of the third motor 182 to move at least two of the plurality of movable bridges 150 along the third frame 130 at the same speed.

The effect of the lunar gravity simulation system for the lander performance test according to an embodiment is as below.

The lunar gravity simulation system for the lander performance test according to an embodiment is capable of proceeding with the lander performance test with respect to a wide range of surfaces by including a plurality of movable bridges that may be moved in the horizontal direction or the vertical direction and simultaneously connecting the plurality of movable bridges to the lander holder to which the lander is connected.

In the lunar gravity simulation system for the lander performance test according to an embodiment, a plurality of movable bridges are connected to one lander holder, and as the lander is moved through the plurality of movable bridges, the movement of the lander in the horizontal direction may be extended while ensuring stability of the structure.

As such, while one or more embodiments have been described with reference to the figures, the descriptions are merely examples, and it will be understood by those of ordinary skill in the art that various changes in form and details may be made therein. Therefore, the technical protective scope of the disclosure should be defined by the technical concept of the appended claims.

The invention claimed is:

1. A lunar gravity simulation system for a lander performance test comprising:
a plurality of first frames extending in a height direction;
a plurality of second frames extending in a first horizontal direction;
three or more third frames extending in a second horizontal direction perpendicular to the first horizontal direction;

a plurality of movable frames extending in the first horizontal direction, each connecting one of the three or more third frames to another third frame, wherein the movable frames are movable in the second horizontal direction along the third frames;
a plurality of movable bridges mounted on the plurality of movable frames and movable along the movable frames in the first horizontal direction;
wherein each of the plurality of movable bridges is arranged between respective third frames of the three or more third frames,
a lander holder connected simultaneously to the plurality of the movable bridges a plurality of connection wires connecting the lander holder to the plurality of movable bridges; and
a lander connected to the lander holder;
wherein each movable bridge comprises
a first motor configured to apply force to its respective connection wire,
a second motor configured to move the movable bridge along its respective movable frame, and
a third motor configured to move its respective movable frame along two of the third frames; and
a controller configured to control an operation of each first motor, each second motor, and each third motor,
wherein the controller is further configured to control the operation of each third motor to move at least two of the plurality of movable bridges along the three or more third frames at a same speed.

2. The lunar gravity simulation system of claim 1, wherein each connection wire is connected to a respective load cell and a respective angle sensor.

3. The lunar gravity simulation system of claim 1, wherein the lander holder has an arc shape or a semicircle shape.

4. The lunar gravity simulation system of claim 1, further comprising a suspension wire connecting the lander holder to the lander.

5. The lunar gravity simulation system of claim 4, wherein a gimbal is included in the suspension wire.

6. The lunar gravity simulation system of claim 1 wherein
a camera is included in the lander, and
the controller is configured to receive image data from the camera and control the operation of the second motors and the third motors according to the image data to move the movable bridges.

7. The lunar gravity simulation system of claim 1, wherein
the plurality of movable bridges are arranged on a same first line and are moved at a same speed through the third motors, and
the first line extends in the first horizontal direction.

* * * * *